(12) United States Patent
Shirai

(10) Patent No.: US 9,990,698 B2
(45) Date of Patent: Jun. 5, 2018

(54) CONTROL APPARATUS, LENS APPARATUS, AND NON-TRANSITORY COMPUTER-READABLE STORAGE MEDIUM THAT DETERMINE DATA AS COEFFICIENT DATA CORRESPONDING TO AN ORDER LESS THAN A PREDETERMINED ORDER OF AN APPROXIMATION FUNCTION

(71) Applicant: CANON KABUSHIKI KAISHA, Tokyo (JP)

(72) Inventor: Kunihiro Shirai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 14/951,730

(22) Filed: Nov. 25, 2015

(65) Prior Publication Data

US 2016/0155214 A1 Jun. 2, 2016

(30) Foreign Application Priority Data

Dec. 1, 2014 (JP) .................................. 2014-242739
Sep. 16, 2015 (JP) .................................. 2015-182429

(51) Int. Cl.
*H04N 5/228* (2006.01)
*G06T 5/00* (2006.01)
(Continued)

(52) U.S. Cl.
CPC .............. *G06T 5/002* (2013.01); *G06T 5/003* (2013.01); *G06T 5/006* (2013.01); *G06T 5/20* (2013.01);
(Continued)

(58) Field of Classification Search
CPC ........... G06T 2207/20201; G06T 2207/20212; H04N 5/23245; H04N 5/23212;
(Continued)

(56) References Cited

U.S. PATENT DOCUMENTS 7,596,286 B2 9/2009 Nose et al.
7,630,584 B2 12/2009 Nose et al.
(Continued)

FOREIGN PATENT DOCUMENTS

CN 101873428 A 10/2010
CN 102930507 A 2/2013
(Continued)

OTHER PUBLICATIONS

Communication including extended European Search Report dated Apr. 6, 2016, issued in corresponding European Patent Application No. 15196953.2-1906.
(Continued)

*Primary Examiner* — Sinh Tran
*Assistant Examiner* — Selam Gebriel
(74) *Attorney, Agent, or Firm* — Fitzpatrick, Cella, Harper & Scinto

(57) ABSTRACT

A control apparatus includes a storage circuit that stores first data containing a plurality of coefficient data obtained by approximating an optical transfer function of an optical system to an approximation function having a predetermined order. An input circuit inputs information of an image processing apparatus that is different from the control apparatus and performs image processing on an image captured by using the optical system. A determination circuit determines second data, that are coefficient data corresponding to an order lesser than the predetermined order of the approximation function, from the first data, based on the information of the image processing apparatus. An output circuit outputs the second data to the image processing apparatus.

13 Claims, 7 Drawing Sheets

(51) Int. Cl.
*H04N 5/232* (2006.01)
*G06T 5/20* (2006.01)

(52) U.S. Cl.
CPC .................. *H04N 5/23229* (2013.01); *G06T 2207/10004* (2013.01); *G06T 2207/20048* (2013.01)

(58) Field of Classification Search
CPC ........... H04N 5/23209; H04N 5/23222; H04N 5/23229; G02B 7/14; G02B 7/36
See application file for complete search history.

(56) References Cited

U.S. PATENT DOCUMENTS

| | | |
|---|---|---|
| 8,319,843 B2 | 11/2012 | Tamura |
| 8,416,335 B2 | 4/2013 | Watanabe |
| 8,537,239 B2 | 9/2013 | Watanabe |
| 8,749,692 B2 | 6/2014 | Watanabe |
| 8,792,015 B2 | 7/2014 | Hatakeyama |
| 8,941,761 B2 | 1/2015 | Tamura |
| 9,007,482 B2 | 4/2015 | Hatekeyama et al. |
| 9,049,356 B2 | 6/2015 | Watanabe |
| 2011/0017827 A1* | 1/2011 | Hayashi ............... G02B 13/005 235/462.11 |
| 2012/0026349 A1* | 2/2012 | Ishii ................... H04N 5/23248 348/208.4 |
| 2012/0050583 A1 | 3/2012 | Watanabe |
| 2012/0075502 A1 | 3/2012 | Watanabe |
| 2012/0189226 A1* | 7/2012 | Okada ..................... G06T 5/20 382/260 |
| 2013/0038748 A1 | 2/2013 | Hatakeyama |
| 2013/0038749 A1 | 2/2013 | Hatakeyama et al. |
| 2013/0342732 A1* | 12/2013 | Yokoyama ............. H04N 5/907 348/231.99 |
| 2014/0028839 A1* | 1/2014 | Ishibashi ............... H04N 5/217 348/140 |
| 2014/0293076 A1* | 10/2014 | Hiasa ................. H04N 5/23248 348/208.99 |
| 2015/0097993 A1* | 4/2015 | Oniki ................. H04N 5/23229 348/241 |

FOREIGN PATENT DOCUMENTS

| | | |
|---|---|---|
| JP | 4337463 B2 | 7/2009 |
| JP | 4337463 B2 | 9/2009 |
| JP | 2012-069099 A | 4/2012 |
| JP | 2012-073691 A | 4/2012 |
| JP | 2013-033496 A | 2/2013 |
| WO | 2010/067740 A1 | 6/2010 |

OTHER PUBLICATIONS

Office Action dated Jan. 4, 2018, issued in corresponding Korean Patent Application No. 10-2015-0166897.
Office Action dated Mar. 2, 2018, issued in corresponding Chinese Patent Application No. 201510868155.1.

* cited by examiner

| NAME OF DEVICES | MAXIMUM ORDERS |
|---|---|
| CAMERA A | 20 |
| CAMERA B | 10 |
| CAMERA C | 5 |

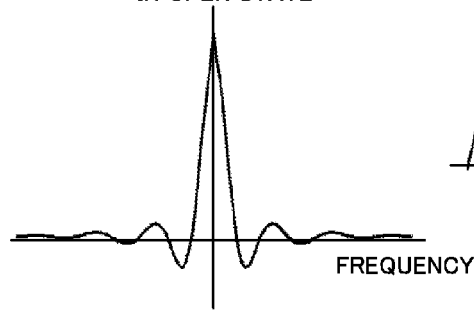
FIG. 8A
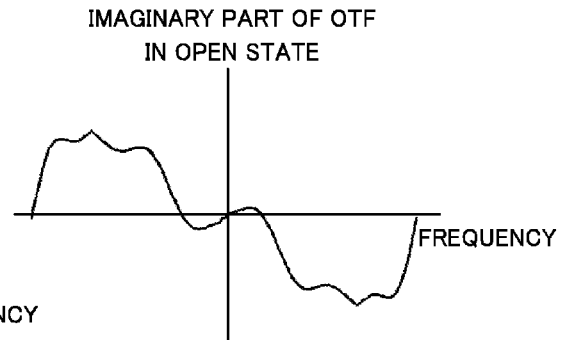
FIG. 8B
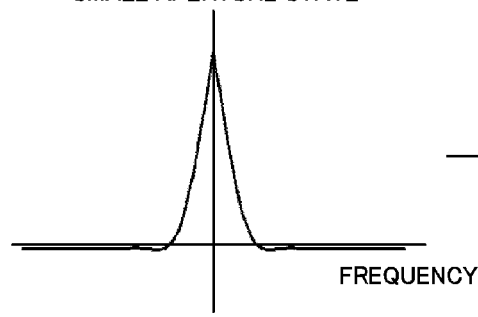
FIG. 8C
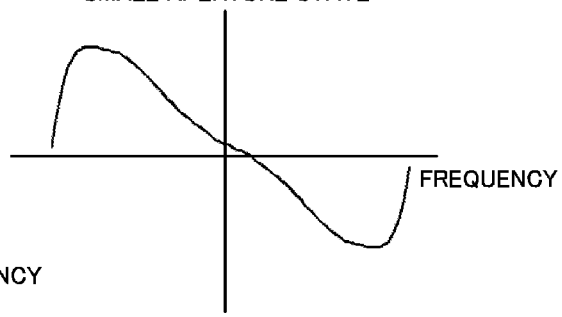
FIG. 8D
| MAXIMUM ORDER | REFERENCE GAIN TABLE |
|---|---|
| 20TH OR HIGHER | Table A |
| BETWEEN 5TH AND 20TH | Table B |
| 5TH OR LOWER | Table C |
REFERENCE TABLE
FIG. 9A
| | MAXIMUM GAIN | | |
|---|---|---|---|
| | Table A | Table B | Table C |
| F1.8 | 5 | 4 | 2 |
| . | 5 | 4 | 3 |
| F5.6 | 5 | 4 | 3 |
| . | 5 | 4 | 4 |
| F11 | 5 | 5 | 4 |
| . | 5 | 5 | 5 |
| F22 | 5 | 5 | 5 |
MAXIMUM GAIN TABLE
FIG. 9B

CONTROL APPARATUS, LENS APPARATUS, AND NON-TRANSITORY COMPUTER-READABLE STORAGE MEDIUM THAT DETERMINE DATA AS COEFFICIENT DATA CORRESPONDING TO AN ORDER LESS THAN A PREDETERMINED ORDER OF AN APPROXIMATION FUNCTION

CLAIM OF PRIORITY

This application claims the benefit of Japanese Patent Application No. 2014-242739, filed on Dec. 1, 2014, and Japanese Patent Application No. 2015-182429, filed on Sep. 16, 2015, which are hereby incorporated by reference herein in their entirety.

BACKGROUND OF THE INVENTION

Field of the Invention

The present invention relates to an image processing system that corrects a deteriorated image caused by an image pickup optical system with high resolution and with high quality.

Description of the Related Art

For an object image captured via an image pickup optical system, light emitted from one point cannot be converged to another point, and has a minute spread due to an influence of a diffraction, an aberration, or the like, that occurs in the image pickup optical system. Such a minutely-spread distribution is referred to as a point spread function (PSF). Due to the influence of the image pickup optical system, the captured image is formed with the PSF convolved with the object image, and accordingly, the image is blurred, and its resolution is deteriorated.

Recently, the captured image is typically stored as electronic data, and a technology to correct, through image processing, the deterioration of the image caused by the optical system has been proposed. Japanese Patent No. 4337463 discloses an image processing method of storing filter coefficients to correct the deterioration of an image to perform image processing. Japanese Patent Laid-open No. 2013-33496 discloses an image processing method of storing filter coefficients for a predetermined approximation function to correct the deterioration of an image and compensating for the deterioration of the image.

In the image processing method disclosed in Japanese Patent No. 4337463, however, it is necessary to store, for each pixel, information of an optical transfer function (OTF data) to create an image restoration filter when the deterioration of the captured image is to be corrected. Since the OTF data are calculated based on each piece of information of an image pickup element and the image pickup optical system, an amount of the OTF data is enormous and, accordingly, it is difficult to store all of the OTF data in each apparatus. In the image processing method disclosed in Japanese Patent Laid-open No. 2013-33496, the OTF data can be reduced, but there is a possibility that a satisfactory correction effect cannot be obtained in other apparatuses, even if the approximation is appropriate for a specific apparatus.

SUMMARY OF THE INVENTION

The present invention provides a control apparatus, a lens apparatus, an image processing system, a control method, and a non-transitory computer-readable storage medium that are capable of providing appropriate OTF data depending on an image processing apparatus performing image restoration processing.

The present invention further provides an image processing apparatus, an image processing system, an image processing method, and a non-transitory computer-readable storage medium that are capable of storing the appropriate OTF data to perform the image restoration processing.

A control apparatus as one aspect of the present invention includes a storage unit configured to store first data containing a plurality of coefficient data, and a determination unit configured to determine second data having a data amount less than a data amount of the first data, from the first data stored in the storage unit, based on information of an image processing apparatus performing image processing on an image captured by using an optical system, and an optical transfer function of the optical system is representable by using the plurality of coefficient data as coefficients of an approximation function having a predetermined order.

A lens apparatus as another aspect of the present invention includes an optical system configured to form an image of an object, and the control apparatus.

An image processing system as another aspect of the present invention includes the control apparatus and an image processing apparatus configured to perform image restoration processing by using the second data.

A control method as another aspect of the present invention includes the steps of inputting information of an image processing apparatus performing image processing on an image captured by using an optical system, and determining second data having a data amount less than a data amount of first data from the first data stored in a storage unit, based on information of the image processing apparatus, the first data containing a plurality of coefficient data, and an optical transfer function of the optical system is representable by using the plurality of coefficient data as coefficients of an approximation function having a predetermined order.

A non-transitory computer-readable storage medium as another aspect of the present invention stores a program causing a computer to execute a process including the steps of inputting information of an image processing apparatus performing image processing on an image captured by using an optical system, and determining second data having a data amount less than a data amount of first data, from the first data, stored in a storage unit, based on information of the image processing apparatus, the first data containing a plurality of coefficient data, and an optical transfer function of the optical system is representable by using the plurality of coefficient data as coefficients of an approximation function having a predetermined order.

An image processing apparatus as another aspect of the present invention includes an input unit configured to receive first data containing a plurality of coefficient data, a determination unit configured to determine, from the first data, second data having a data amount less than a data amount of the first data, and a processing unit configured to perform, by using the second data, image processing on an image captured by using an optical system, and an optical transfer function of the optical system is representable by using the plurality of coefficient data as coefficients of an approximation function having a predetermined order.

An image processing system as another aspect of the present invention includes the image processing apparatus and a control apparatus configured to output the first data.

An image processing method as another aspect of the present invention includes the steps of receiving first data containing a plurality of coefficient data, determining, from the first data, second data having a data amount less than a data amount of the first data, and performing, by using the second data, image processing on an image captured by using an optical system, and an optical transfer function of the optical system is representable by using the plurality of coefficient data as coefficients of an approximation function having a predetermined order.

A non-transitory computer-readable storage medium as another aspect of the present invention stores a program causing a computer to execute a process including the steps of receiving first data containing a plurality of coefficient data, determining, from the first data, second data having a data amount less than a data amount of the first data, and performing, by using the second data, image processing on an image captured by using an optical system, and an optical transfer function of the optical system is representable by using the plurality of coefficient data as coefficients of an approximation function having a predetermined order.

Further features and aspects of the present invention will become apparent from the following description of exemplary embodiments with reference to the attached drawings.

BRIEF DESCRIPTION OF THE DRAWINGS

FIGS. 8A to 8D are an example of OTF data depending on an aperture stop in the second embodiment.

FIGS. 9A and 9B are diagrams of a reference table and a maximum gain table in the second embodiment.

DESCRIPTION OF THE EMBODIMENTS

Figure 1A:
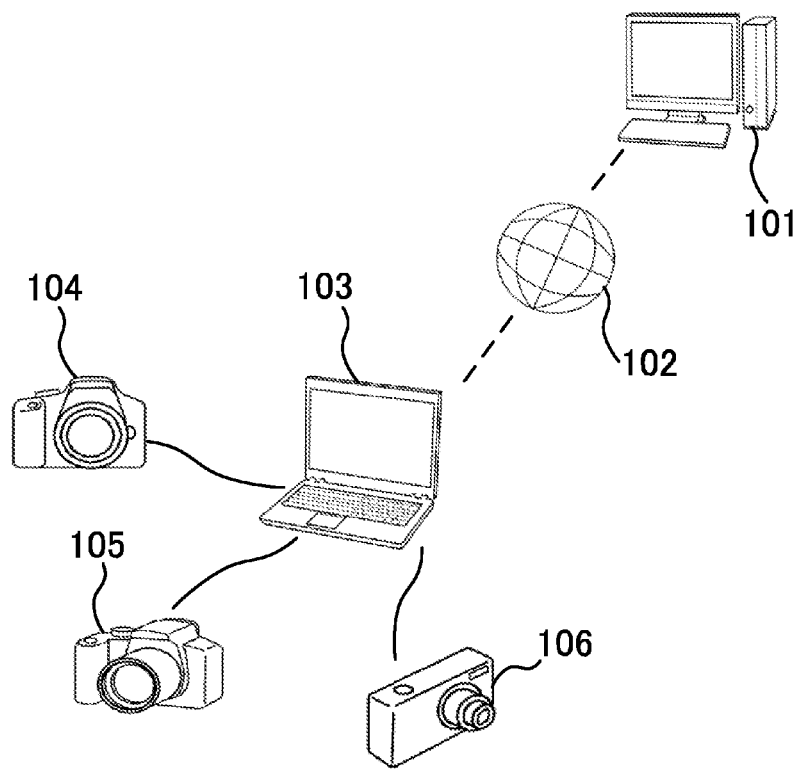
FIG. 1A is a configuration diagram of an image processing system in a first embodiment.

Exemplary embodiments of the present invention will be described below with reference to the accompanying drawings.

First of all, a typical image restoration method will be described. The following expression (1) is satisfied when, in a real space (x,y), f(x,y) is an image that is not deteriorated by an optical system, h(x,y) is a point spread function (PSF), and g(x,y) is a deteriorated image.

$$g(x,y) = \iint f(X,Y) \ast h(x-X, y-Y) dX dY \quad (1)$$

When the Fourier transform is performed for expression (1) to convert the real space (x,y) to a frequency space (u,v), the following expression (2) is satisfied.

$$G(u,v) = F(u,v) \ast H(u,v) \quad (2)$$

In expression (2), F(u,v), G(u,v), and H(u,v) are results of the Fourier transform of f(x,y), g(x,y), and h(x,y), respectively. According to expression (2), the following expression (3) is satisfied.

$$F(u,v) = G(u,v)/H(u,v) \quad (3)$$

Expression (3) means that the result F(u,v) of the Fourier transform of the image f(x,y), which is not deteriorated, can be obtained by dividing the result G(u,v) of the Fourier transform of the deteriorated image g(x,y) in the frequency space by the result H(u,v) of the Fourier transform of h(x,y) as the point spread function (PSF). Therefore, the image f(x,y), which is not deteriorated, can be obtained by performing the inverse Fourier transform for F(u,v).

Actually, however, if such processing is performed to obtain the image f(x,y) that is not deteriorated, a noise that occurs in an image pickup element is amplified and, accordingly, a satisfactory image cannot be obtained.

To solve the problem, using the Wiener filter W(u,v) represented by the following expression (4) is known as an image restoration method of suppressing the amplification of the noise.

$$1/H(u,v) \ast (|H(u,v)|^2/(|H(u,v)|^2 + \Gamma)) \quad (4)$$

In expression (4), symbol H(u,v) denotes an optical transfer function (OTF), and symbol $\Gamma$ denotes a constant to decrease an amount of amplification of the noise.

By multiplying expression (4) by the OTF having frequency information and phase information of the image pickup optical system, a phase of the PSF that occurs due to the diffraction or the aberration of the optical system becomes zero and frequency characteristics are amplified, and, accordingly, a high resolution and satisfactory image can be obtained. In order to use expression (4) effectively, it is necessary to obtain precise OTF information of the image pickup optical system. As a method of obtaining the OTF information, if design value information of the image pickup optical system is available, the OTF information can be obtained by calculation based on the design value information. Alternatively, the OTF information can be obtained by photographing a point light source and by performing the Fourier transform on the point spread function (PSF). Typically, the image pickup optical system used for a camera has an optical performance (such as an F number and an aberration) that greatly varies depending on an image height. Accordingly, in order to correct a deterioration of an object image, expression (4) cannot be directly calculated on a frequency space all at once, and instead, expression (4) is converted into a filter on a real space for each image height to perform the processing to correct the deterioration.

An optical image (object image) imaged (formed) via the image pickup optical system is electrically sampled by an image pickup element. Since the optical image that originally has continuous values is converted into discrete values, the optical image contains, in a frequency space, frequency signals with a period of a sampling frequency. When the frequency signals are distributed over one-half of the sampling frequency, the frequency signals are overlapped due to the periodicity, and, accordingly, precise signals cannot be reproduced. The value of one-half of the sampling frequency is referred to as a Nyquist frequency. The Nyquist frequency is represented by fn=1/(2*b), where b is a pixel pitch of the image pickup element.

Spatial frequency characteristics of the optical image immediately in front of the image pickup element are represented by the OTF of the image pickup optical system. In performing image restoration processing, it is necessary to match a size of a tap of an image restoration filter and a size of a pixel of the image pickup element, and, additionally, it is preferred that the characteristics of openings of the image pickup element are reflected. The former corresponds to cutting out the OTF by the spatial frequency in which the Nyquist frequency of the image pickup element is a maximum value, and the latter corresponds to applying a low-pass filter to the OTF by the image pickup element. Accordingly, the OTF information used for creating the image restoration filter is not uniquely determined only by the image pickup optical system, and it depends on the image pickup element.

First Embodiment

First of all, referring to FIG. 1A, an image processing system in a first embodiment of the present invention will be described. FIG. 1A is a configuration diagram (overall view) of the image processing system in this embodiment. In FIG. 1A, reference numeral 101 denotes an information processing apparatus that calculates an optical transfer function (OTF) of an image pickup optical system based on a design value or a measured value, and stores the optical transfer function. The information processing apparatus 101 is provided by a provider providing optical transfer function data (OTF data) for correcting a captured image. The OTF data created by the information processing apparatus 101 can be managed on a network 102.

Next, a data creating method of the OTF data created by the information processing apparatus 101 will be described in detail. This embodiment describes a method of creating and storing coefficients by approximating an OTF (design value or measured value) of the image pickup optical system to a predetermined function by fitting processing. In this embodiment, a Legendre polynomial expression is used as a function used in the fitting processing. However, this embodiment is not limited thereto, and, for example, another orthogonal function such as a Chebuyshev polynomial expression may be used. The Legendre polynomial expression is represented by the following expression (5). In expression (5), symbol [x] denotes a maximum integer that does not exceed a value of x.

$$P_n(x) = \frac{1}{2^n} \sum_{k=0}^{[\frac{n}{2}]} (-1)^k \frac{(2n-2k)!}{k!(n-k)!(n-2k)!} x^{n-2k} \quad (5)$$

The OTF is represented in the form of z=f(x,y). Therefore, in this embodiment, it is necessary to calculate coefficients aij in the following expression (6).

$$z = \sum_{i}^{i=m} \sum_{j}^{j=n} a_{ij} P(x)_i P(y)_j \quad (6)$$

Expression (6) is an orthogonal function (approximation function), and the values of the coefficients aij are determined independently of the order (degree) used in the fitting processing. As described above, the OTF of the image pickup optical system is approximated to the predetermined function by the fitting processing to create the coefficient, and, accordingly, a storage amount of necessary data can be reduced. Furthermore, by using the characteristics of the orthogonal function represented by expression (6), the fitting processing of the OTF can be terminated by a low order to the extent where the fitting processing can be sufficiently performed with high accuracy, and, accordingly, an amount of information of the coefficients to be stored can be reduced.

The real part of the OTF is symmetric with respect to each of the meridional direction and the sagittal direction. The imaginary part of the OTF is symmetric with respect to the meridional direction although its sign (plus or minus) is opposite to each other, and it is symmetric with respect to the sagittal direction. According to such a symmetry, information on a symmetric region such as at least one quarter (¼) region in an entire domain is sufficient as data of the OTF to be used for fitting. In this embodiment, for such a reason, the quarter region in the entire domain is cut out from the OTF for each of the real part and the imaginary part so as to contain a DC component to perform highly-accurate fitting processing of the OTF.

If the fitting processing is terminated by a low order when requiring a predetermined accuracy, an original OTF cannot be reconstructed, and, accordingly, there is a possibility that appropriate correction cannot be performed. Therefore, an appropriate order varies depending on a shape of the original OTF. In other words, when a provider creates OTF data, it is necessary to perform the approximation by using a sufficient order (i.e., sufficiently higher order). It is preferred that the created OTF data are managed on the network 102 so as to be always available to a user.

With respect to the OTF data created by this method, the user can access the information processing apparatus 101 via the network 102 from the information processing apparatus 103 owned by the user to acquire only the information of a necessary optical system. In this embodiment, the user acquires the OTF data stored in the information processing apparatus 101 via the network 102, and, alternatively, the OTF data can be recorded in a recording medium (storage medium) such as a CD-R and a DVD to be distributed.

The user can acquire the OTF information (OTF data) of the optical system (image pickup optical system) to be corrected by using the information processing apparatus 103 owned by the user. An image processing apparatus of this embodiment is, for example, the information processing apparatus 103 (image processing application (not illustrated) installed in the information processing apparatus 103) owned by the user or the image pickup apparatuses 104, 105, and 106 owned by the user. There is a high possibility that the accuracies of the OTF data needed for correction for the respective image processing apparatuses are different from each other. Accordingly, in order to correct a captured image appropriately with a small amount of the OTF data (amount of the OTF information), it is necessary to send appropriate (more preferably, optimum) OTF data (OTF information) for each image processing apparatus. In this embodiment, the appropriate OTF data can be sent to each of the image processing application installed in the information processing apparatus 103 and the image pickup apparatuses 104, 105, and 106, provided as an image processing apparatus. For example, the image processing application described above can be applied to any OTF data if its program is changed. On the other hand, an image processor (image processing apparatus in this embodiment) provided in each of the image pickup apparatuses 104 to 106 typically gives priority to a processing speed, and, accordingly, it is configured by hardware, and an amount of input data is restricted in many cases. Accordingly, approximation coefficients of the OTF data may be limited especially in an inexpensive image pickup apparatus that gives priority to cost.

This embodiment provides a method of setting OTF data of a desired optical system to each of the image pickup apparatuses 104 to 106. For example, the information processing apparatus 103 acquires the OTF data stored in a storage medium provided in the information processing apparatus 101 via the network 102. Then, it transfers the OTF data acquired by the information processing apparatus 101 to the image pickup apparatuses 104 to 106 via a USB or communication (wired communication or wireless communication). In this embodiment, the information processing apparatus 103 transfers appropriate OTF data depending on the connected device (for example, any of the image pickup apparatuses 104 to 106).

Figure 1B:
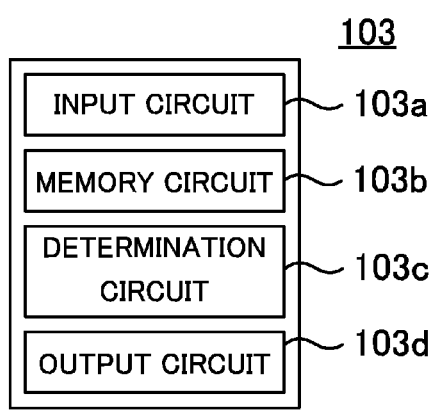
FIG. 1B is a block diagram of a control apparatus in the first embodiment.

Next, referring to FIG. 1B, an outline of the information processing apparatus 103 (control apparatus) will be described. FIG. 1B is a block diagram of the information processing apparatus 103. The information processing apparatus 103 (control apparatus) includes an input circuit (input unit) 103a, a memory circuit (memory or storage unit) 103b, a determination circuit (determiner or determination unit) 103c, and an output circuit (output unit) 103d. The input circuit 103a and the output circuit 103d are, for example, a Wi-Fi (Wireless Fidelity) communication module. The connection module is not limited to a communication circuit for wireless communication, and, alternatively, it may be a communication circuit for wired communication. The memory circuit 103b is a memory, such as a ROM, and the determination circuit 103c is a processor, such as a CPU.

The input circuit 103a inputs information of the image processing apparatus (for example, the image processing application installed in the information processing apparatus 103 or each of the image pickup apparatuses 104 to 106). The memory circuit 103b stores data relating to a first optical transfer function (OTF), i.e., first data containing a plurality of coefficient data (for example, OTF data obtained via the network 102). The determination circuit 103c determines, from the first data stored in the memory circuit 103b, second data having a data amount less than a data amount of the first data. The second data correspond to data relating to a second optical transfer function, i.e., OTF data appropriate for each image processing apparatus. The output circuit 103d outputs the second data to the image processing apparatus. The optical transfer function (OTF) of the optical system is representable by using a plurality of coefficient data as coefficients of an approximation function having a predetermined order (m-th order). Preferably, the plurality of coefficient data are determined by approximating the optical transfer function of the optical system to the approximation function having the predetermined order (predetermined degree). Preferably, the second data are coefficient data corresponding to an order (n-th order (n<m)) less than the predetermined order of the approximation function.

Figures 2, 3:
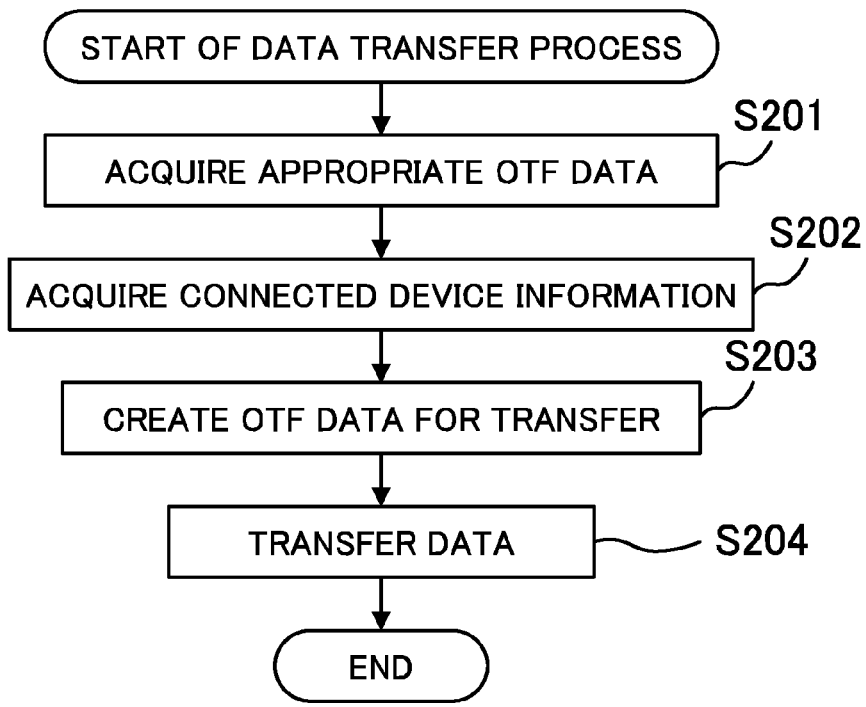
FIG. 2 is a flowchart illustrating data transfer processing of optical transfer function (OTF) data in the first embodiment.
FIG. 3 is an example of a table illustrating a relation between a connected device (image pickup apparatus) and a maximum order in the first embodiment.

Next, referring to FIG. 2, a process flow in which the information processing apparatus 103 transfers the optimum OTF data depending on a connected device will be described. FIG. 2 is a flowchart illustrating a data transfer process of the OTF data. Each step in FIG. 2 is performed by a controller (CPU) of the information processing apparatus 103 based on an instruction of a program of an application installed in the information processing apparatus 103.

First, at step S201, the information processing apparatus 103 (controller) downloads (acquires) the OTF data (appropriate OTF data) of the optical system to be corrected, i.e., image pickup optical system used for acquiring a captured image, from the information processing apparatus 101 via the network 102. For example, an application for data registration owned by a user is installed in the information processing apparatus 103, and the user can select a necessary optical system (image pickup optical system) by using this application. The OTF data acquired at step S201 is stored in a memory (memory circuit) provided in the information processing apparatus 103 of the user.

Subsequently, at step S202, the information processing apparatus 103 (application installed in the information processing apparatus 103) acquires information of a device (for example, image processing apparatuses, such as image pickup apparatuses 104 to 106) connected to the information processing apparatus 103. Specifically, the information processing apparatus 103 determines an order that is available for an image processing block to perform correction by using OTF data of the image pickup apparatuses 104 to 106.

Subsequently, at step S203, the information processing apparatus 103 reduces, from the OTF data acquired at step S201, the order (part of data) of the OTF data based on the connected device information (maximum order) acquired at step S202, and it creates OTF data for transfer. In other words, the determination circuit 103c determines, based on first data (OTF data acquired at step S201) stored in the memory circuit 103b, second data (OTF data for transfer) having a data amount less than a data amount of the first data. In this case, as a method of determining a necessary order (degree), the information processing apparatus 103 can adopt a method of receiving the available maximum order directly from the connected devices (image pickup apparatuses 104 to 106). Alternatively, the information processing apparatus 103 may store a table indicating a relationship between the connected device and the maximum order in the memory circuit 103b provided in the information processing apparatus 103, and it may calculate the necessary order based on the table.

FIG. 3 is an example of a table illustrating a relationship between the connected device (cameras A to C as image pickup apparatuses) and the maximum order. As illustrated in FIG. 3, the maximum order for an expensive camera A is twenty (i.e., the camera A is applicable up to twentieth order), and the maximum order for an inexpensive camera C is five (i.e. the camera C is applicable up to fifth order).

After the maximum order (applicable maximum order) is determined for each connected device (image pickup apparatus) at steps S202 and S203, the flow proceeds to step S204. At step S204, the information processing apparatus 103 transfers OTF data, which is obtained by extracting orders up to the maximum order of the connected device from among the orders of the OTF data acquired at step S201, to each device. In this case, when the image restoration processing is performed by an image processing application installed in the information processing apparatus 103, the image restoration processing can be performed by adopting the maximum order of the application. When an effect similar to that of the image pickup apparatus is required, the maximum order obtained at the time of capturing an image may be recorded in an image file to perform correction processing based on the value (i.e., the recorded maximum order).

In accordance with the flow illustrated in FIG. 2, individual data according to characteristics of each image pickup apparatus can be determined based on a single piece of original data, and the individual data can be transferred to the corresponding image pickup apparatus. Therefore, it is possible to perform appropriate correction for each image pickup apparatus (image processing apparatus) without storing original data of the OTF data in each image pickup apparatus.

As described above, the first embodiment describes, as an example, a configuration in which the information processing apparatus 103 reduces the order of the OTF data based on the information of the image processing apparatus as a connected device to create the OTF data for transfer, but it is not limited thereto.

Figure 1C:
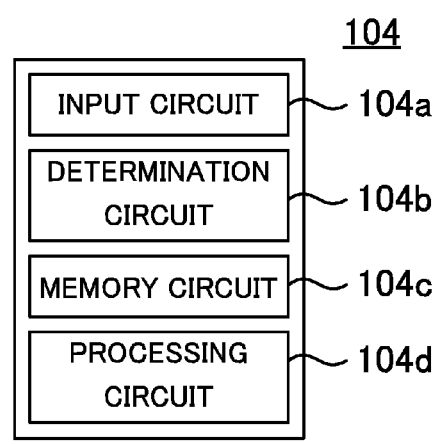
FIG. 1C is a block diagram of an image processing apparatus in the first embodiment.

FIG. 1C is a block diagram illustrating a configuration of an image processing apparatus with respect to image restoration processing. An image pickup apparatus 104 as an example of the image processing apparatus includes an input circuit (input unit) 104a, a determination circuit (determiner or determination unit) 104b, a memory circuit (memory or storage unit) 104c, and a processing circuit (processor or processing unit) 104d. The input circuit 104a is, for example, a Wi-Fi communication module. The connection module is not limited to a communication circuit for wireless communication, and, alternatively, it may be a communication circuit for wired communication. The determination circuit 104b and the processing circuit 104d are constituted by a processor, such as a CPU, and the memory circuit 104c is a memory, such as a ROM.

For example, the information processing apparatus 103 transfers the acquired OTF data directly to the image pickup apparatus 104, and the image pickup apparatus 104 receives the OTF data via the input circuit 104a. The determination circuit 104b reduces the order of the received OTF data to be stored in the memory circuit 104c, and the processing circuit 104d generates an image restoration filter by using the stored OTF data to perform image restoration processing.

Alternatively, the information processing apparatus 103 can divide the acquired OTF data depending on the order to be transferred to the image pickup apparatus 104. The determination circuit 104b may store, in the memory circuit 104c, only the OTF data having the applicable order from among the OTF data received by the input circuit 104a.

Second Embodiment

Figure 4:
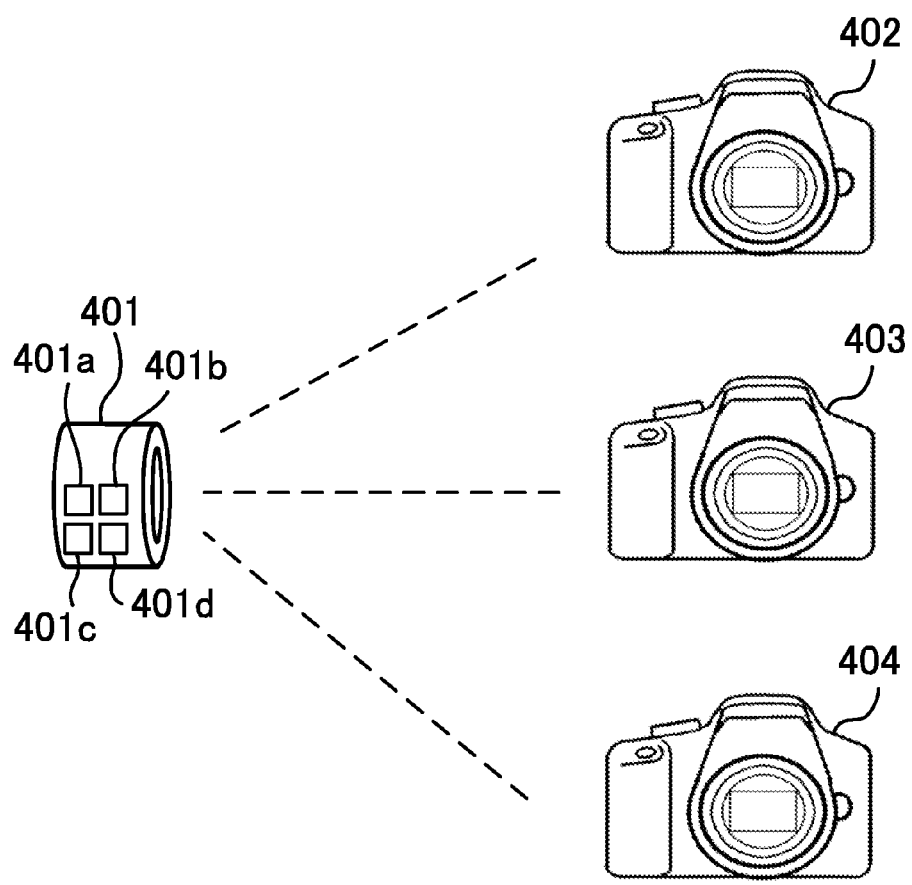
FIG. 4 is a configuration diagram of an image processing system in a second embodiment.

Next, referring to FIG. 4, an image processing system in a second embodiment of the present invention will be described. FIG. 4 is a configuration diagram of the image processing system in this embodiment, and it illustrates the image processing system that is applicable to a lens interchangeable type image pickup apparatus.

Reference numeral 401 denotes an interchangeable lens (lens apparatus) including an optical system (image pickup optical system), and it can be mounted on various image pickup apparatuses (for example, image pickup apparatuses 402, 403, and 404). The interchangeable lens 401 includes an input circuit (input unit) 401a, a memory circuit (memory or storage unit) 401b, a determination circuit (determiner or determination unit) 401c, and an output circuit (output unit) 401d. These elements have similar functions to the respective elements of the information processing apparatus 103 in the first embodiment described with reference to FIG. 1B. A ROM (memory circuit 401b) in the interchangeable lens 401 stores OTF data (OTF information) for correction of a deterioration (optical deterioration) caused by the optical system. For example, the ROM in the interchangeable lens 401 stores the OTF data containing the order (degree) sufficient to reproduce the characteristics in the form described in the first embodiment.

The interchangeable lens 401 can be mounted on each of the image pickup apparatus 402, 403, and 404, and, specifically, the image pickup apparatus 402, 403, and 404 indicate a high-end model, a midrange model, and a popular model, respectively. Typically, the high-end model (image pickup apparatus 402) includes a high-spec hardware configuration compared with the midrange model (image pickup apparatus 403) or the popular model (image pickup apparatus 404), and the high-end model has a high performance in capacity and processing speed.

In this embodiment, similar to the information processing apparatus 103 in the first embodiment, the interchangeable lens 401 is configured to select and to send the order of the OTF data stored in the ROM (memory circuit) depending on system restrictions of the image pickup apparatuses 402 to 404. In this case, there is a possibility that sufficient correction cannot be performed in a specific region of the interchangeable lens 401 by using the OTF data having the maximum order that is permitted by the inexpensive image pickup apparatus 404 (popular model). Referring to FIGS. 6A to 6D, this phenomenon will be described. FIGS. 6A to 6D are an example of the OTF data in this embodiment.

Figure 6A:
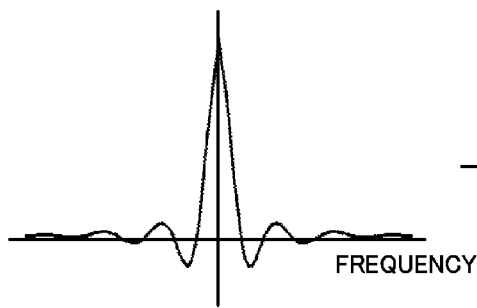
FIGS. 6A to 6D are an example of OTF data in the second embodiment.
Figure 6B:
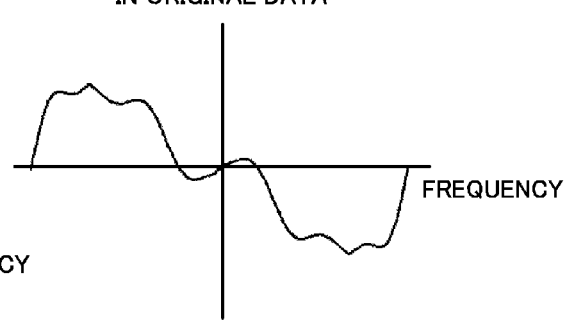
Figure 6C:
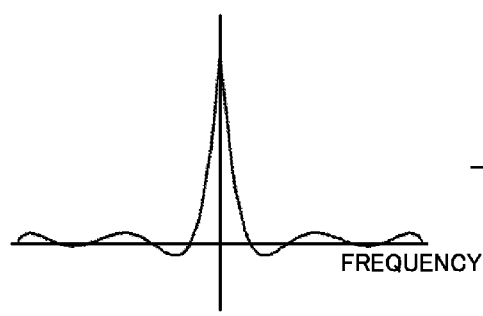
Figure 6D:
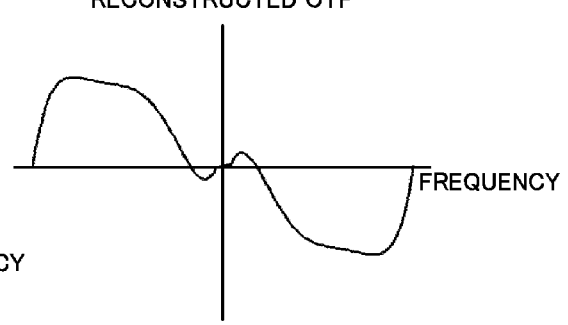

As described in the first embodiment, a real part and an imaginary part exist in the OTF data, and a PSF as a spread function of an original point can be reconstructed by performing the inverse Fourier transform on the combination of the real part and the imaginary part. FIGS. 6A and 6B illustrate a real part of OTF data (real part of an OTF in original data) and an imaginary part of the OTF data (imaginary part of the OTF in the original data) for a certain image capturing condition of the interchangeable lens 401, respectively. FIGS. 6C and 6D illustrate, as actual data, a real part of OTF data (real part of a reconstructed OTF) and an imaginary part of the OTF data (imaginary part of the reconstructed OTF) reconstructed based on the order-reduced OTF data, respectively.

As can be seen from the comparisons between FIGS. 6A and 6C and between FIGS. 6B and 6D, a shape of each of the functions (OTF data) is changed. In other words, the point spread function (PSF) reconstructed based on FIGS. 6C and 6D is changed from an original PSF. When the reconstructed OTF is different from an OTF before reconstruction, correction is to be performed by using characteristics different from characteristics of an optical system (image pickup optical system) used for capturing an image, and, accordingly, there is a possibility that an unexpected effect appears in a corrected image. Specifically, an edge oscillates and, accordingly, a plurality of edges such as ringing appear, or a harmful effect such as a black level depression in which a border of the edge greatly sinks appears in the image. Accordingly, for the inexpensive image pickup apparatus 404, which cannot hold the order sufficient to perform appropriate correction, it is also necessary to take a measure to weaken a correction amount in order to reduce the occurrence of the harmful effect as descried above.

Figure 7A:
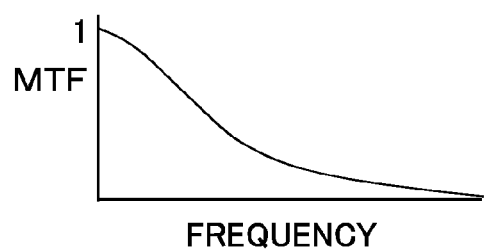
FIGS. 7A to 7C are graphs illustrating a modulation transfer function (MTF) and a maximum gain in the second embodiment.
Figure 7B:
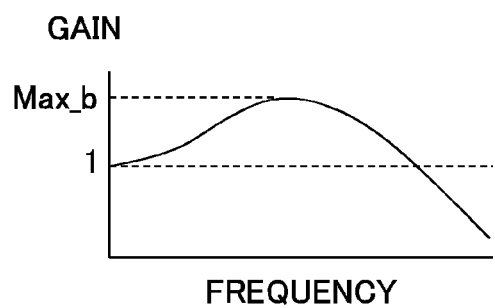
Figure 7C:
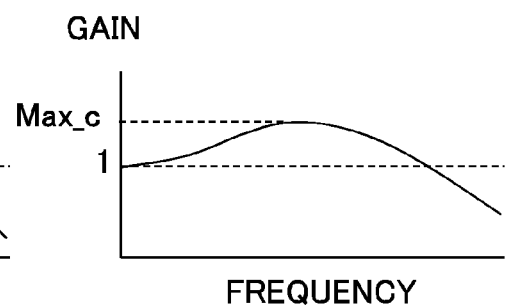

As an example of the measure to weaken the correction amount, there is a method of reducing a maximum gain. First, the maximum gain will be described. When creating an image restoration filter, it is necessary to create the filter considering a noise term such as Γ like the Wiener filter represented by expression (4), instead of using the inverse of a simple OTF in creating the filter. By controlling a value (function) of Γ, the maximum gain within a frequency region can be provided. Referring to FIGS. 7A to 7C, it will be described.

FIGS. 7A to 7C are graphs illustrating an MTF and the maximum gains. FIG. 7A illustrates a graph of the modulation transfer function (MTF) of the optical system to be corrected. The relationship between the OTF and the MTF can be represented by the following expression (7).

$$\text{OTF}(u,v) = \text{MTF}(u,v) e^{iPTF(u,v)} \qquad (7)$$

As described above, the MTF (Modulation Transfer Function) is an absolute value of the OTF, and the PTF (Phase Transfer Function) is a phase shift as a function of a spatial frequency.

The image restoration processing is processing to perform a restoration of the MTF by applying (i.e., multiplying) the inverse of the MTF as a filter with respect to the strength of the restoration. In this case, in a high-frequency region, a signal is greatly decreased, as illustrated in FIG. 7A. Therefore, when the inverse of the MTF is multiplied to an image, a large gain is applied, and, as a result, it is not preferable as an output image. Accordingly, as described above, a method of creating a filter by inserting a term to decrease a gain at a high frequency like the Wiener filter represented by expression (4) is typically adopted. By taking a measure for the function of Γ in the Wiener filter, it is possible to adjust a way to decrease the gain at the high frequency. In other words, by adjusting the term Γ, the gain can be controlled as a parameter that determines a degree of the restoration (i.e., to what extent the image is to be restored).

For example, with respect to the image pickup apparatus 402 that has little hardware restriction and that is capable of performing comparatively active restoration processing, as illustrated in FIG. 7B, the term Γ is set so that a value of the maximum gain becomes Max_b. On the other hand, with respect to the image pickup apparatus 404 that has much hardware restriction and that is unable to perform active correction, as illustrated in FIG. 7C, the term Γ is set so that the value of the maximum gain becomes Max_c less than Max_b. As a result, the effect of the image restoration can be reduced, and it is possible to reduce the harmful effect, such as ringing and black level depression. Accordingly, the image pickup apparatus 404 with much hardware restriction can perform appropriate image restoration processing even when the available order of the image pickup apparatus 404 is small.

As described above, when a limitation is applied to the image pickup apparatus 404 by using a constant maximum gain for any conditions, the gain is decreased also in a region where OTF data can be sufficiently reproduced by the approximation at a low order, and, accordingly, there is a possibility that the correction effect is decreased more than necessary. Referring to FIGS. 8A to 8D, the specific example will be described.

FIGS. 8A to 8D are an example of OTF data depending on an aperture stop in this embodiment. FIGS. 8A and 8B are an example of OTF data (data before reconstruction) of a real part (real part of OTF in an open state) and an imaginary part (imaginary part of OTF in the open state) of the OTF on a condition that the aperture stop of an interchangeable lens is in the open state. FIGS. 8C and 8D are an example of OTF data (data before the reconstruction) of a real part (real part of OTF in a small aperture state) and an imaginary part (imaginary part of OTF in the small aperture state) of the OTF on a condition that the aperture stop of the interchangeable lens is in the small aperture state.

In a typical interchangeable lens, in many cases, various aberrations occur near the open state as illustrated in FIGS. 8A and 8B, and, accordingly, the OTF has a complicated shape. On the other hand, when the opening of the aperture stop is narrowed, the influence of diffraction increases and influences of other aberrations are buried. Accordingly, as illustrated in FIGS. 8C and 8D, the OTF has a simple shape (i.e., a shape with simple aberrations). In other words, it is necessary to perform the approximation by using a high-order approximation function to reproduce the original OTF with respect to the OTF in the open state, while a low-order approximation function can be used to sufficiently reproduce the original OTF in the small aperture state.

Figure 5:
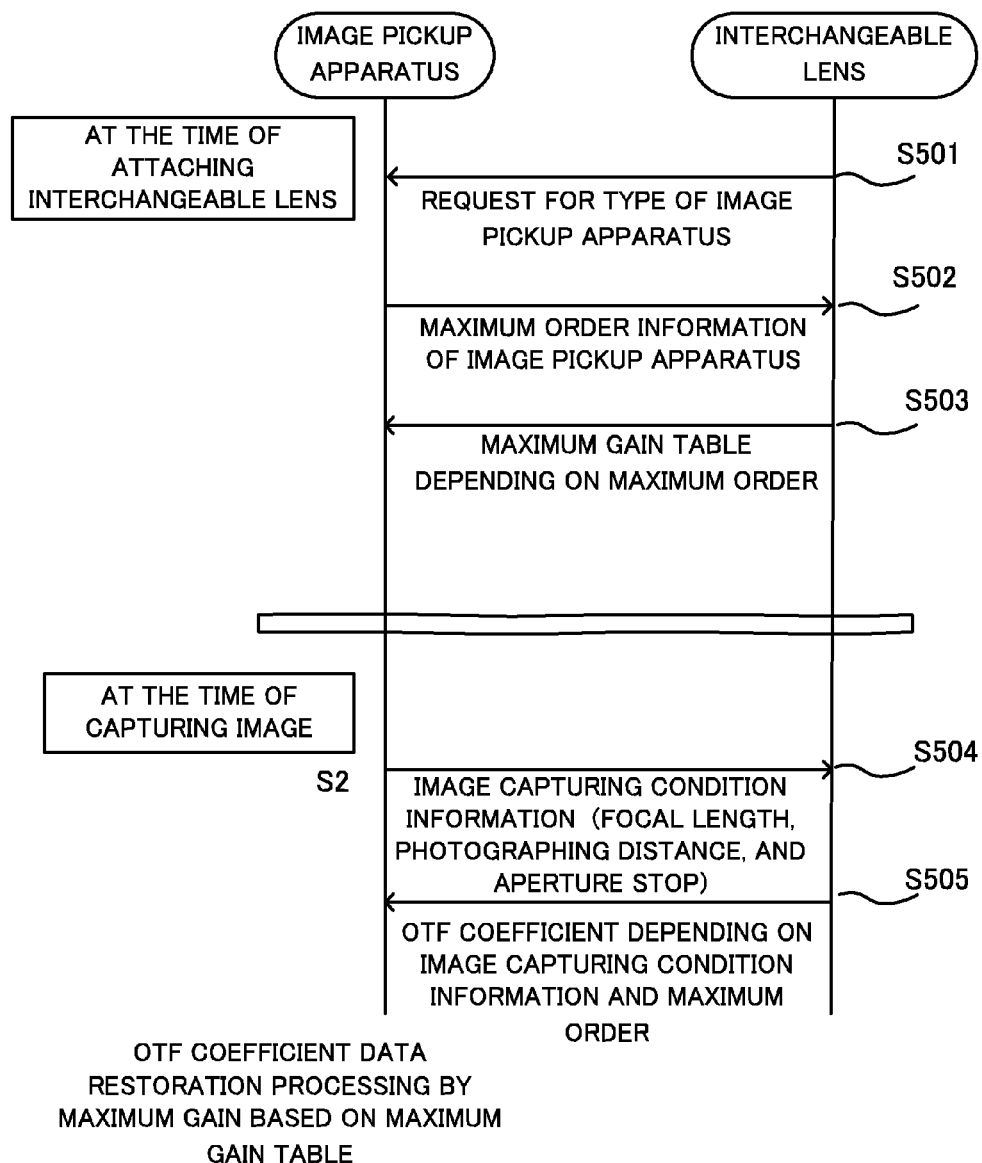
FIG. 5 is a sequence diagram of the image processing system in the second embodiment.

In accordance with this phenomenon, referring to FIG. 5, a method of obtaining the correction effect, as much as possible even when the image pickup apparatus with much hardware restriction, will be described. FIG. 5 is a sequence diagram of an image processing system in this embodiment, and it illustrates a data sequence when the interchangeable lens 401 is mounted on any one of the image pickup apparatuses 402 to 404.

When the interchangeable lens 401 is mounted on any one of the image pickup apparatuses (image processing apparatus), at step S501, the interchangeable lens 401 requests for information relating to a type of the image pickup apparatus for the connected image pickup apparatus. For example, the interchangeable lens 401 requests for information as to whether the connected image pickup apparatus is capable of performing the correction processing (i.e., capable of performing the image restoration processing). Then, the interchangeable lens 401 determines whether the connected image pickup apparatus is capable of performing the image restoration processing, and it sends the determination result to the connected image pickup apparatus. When the connected image pickup apparatus is capable of performing the image restoration processing, the interchangeable lens 401 requests for information relating a maximum order (maximum order information) for the connected image pickup apparatus.

Subsequently, at step S502, the image pickup apparatus sends the information relating to the maximum order that is permitted by the image pickup apparatus, i.e., maximum order information, to the interchangeable lens 401 if the image pickup apparatus is capable of performing the image restoration processing in response to the request from the interchangeable lens 401 at step S501. In this case, the interchangeable lens 401 inputs, via the input circuit 401a, the maximum order information (information of the image pickup apparatus) sent from the image pickup apparatus. Then, at step S503, the interchangeable lens 401 extracts a maximum gain table from a reference table stored in the ROM provided in the interchangeable lens 401 depending on the maxim order information acquired from the image pickup apparatus at step S502, and it sends the extracted maximum gain table to the image pickup apparatus. In other words, the determination circuit 401c determines the second data depending on the information relating to the maximum order that is permitted by the image processing apparatus. Preferably, the determination circuit 401c determines information relating to a maximum gain (correction strength) used for generating the image restoration filter depending on the information relating to the maximum order. Preferably, the determination circuit 401c determines the second data based on image capturing condition information determined for capturing an image.

Referring to FIGS. 9A and 9B, a reference table stored in the ROM provided in the interchangeable lens 401 and the maximum gain table extracted from the reference table will be described. FIGS. 9A and 9B are diagrams illustrating the reference table and the maximum gain table, and FIGS. 9A and 9B illustrate an example of the reference table and the maximum gain table, respectively.

The reference table illustrated in FIG. 9A is a table to determine a gain table to be sent depending on the order of the connected image pickup apparatus, i.e., a table that relates the order of the image pickup apparatus to the gain table. FIG. 9A indicates that, for example, the image pickup apparatus with a 10th order as the maximum order sends the gain table of "Table B".

The maximum gain table illustrated in FIG. 9B is a table indicating a value of the maximum gain depending on the aperture stop. As described above, when the image pickup apparatus with a 10th order as the maximum order is used, reference is made to "Table B" in FIG. 9A. Therefore, with respect to an image captured at an aperture value of F5.6, the filter is generated on a condition that the maximum gain is four. Especially, when the image pickup apparatus has much hardware restriction, reference is made to "Table C" in FIG. 9A. In this case, the maximum gain is two in the open state of the aperture stop, while the maximum gain is five in the small aperture state. In other words, as described with reference to FIGS. 8A to 8D, the active correction cannot be performed in a region where a high order is needed for the reproduction of the OTF, and, accordingly, the maximum gain is set to be doubled to reduce the occurrence of the harmful effect. On the other hand, in the small aperture state, the OTF can be reproduced by a low order, and, accordingly, the active correction is possible. In this embodiment, the maximum gain table for the aperture stop is described, and a table considering other parameters (other image capturing condition information, such as a photographing distance and a focal length) according to characteristics of the optical system, can also be created.

Next, returning to FIG. 5, an operation in capturing an image will be described. At step S504, the image pickup apparatus sends the image capturing condition information, such as the focal length, the photographing distance, and the aperture stop, to the interchangeable lens 401 at the timing (S2) at which a user presses a shutter button when capturing the image. When the image capturing condition information is determined for capturing the image, the OTF is specified. Accordingly, the interchangeable lens 401 sends, to the image pickup apparatus, appropriate OTF data acquired from OTF data (OTF coefficient data) stored in the ROM provided in the interchangeable lens 401. In this case, the OTF data are sent up to data with the maximum order of the image pickup apparatus acquired at step S502. The image pickup apparatus receiving the OTF data determines the maximum gain based on the reference table and the maximum gain table obtained when the interchangeable lens 401 is mounted (at step S503), and it generates an image restoration filter to perform image restoration. As described above, by preparing one single type of OTF data in the ROM provided in the interchangeable lens 401, it is possible to perform appropriate image restoration processing depending on attachable various image pickup apparatuses.

The interchangeable lens 401 may be configured so that the OTF data stored in the ROM are sent, without any change, to the image pickup apparatus, and the image pickup apparatus adjusts the order contained in the OTF data to determine the maximum gain based on the reference table and the maximum gain table.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

In each embodiment as described above, in an image processing system that reconstructs an optical transfer function (OTF) to correct a deteriorated image (captured image), i.e., that performs image restoration processing, appropriate OTF data (approximated data) depending on an image processing apparatus that performs the image restoration processing can be provided. According to each embodiment, a control apparatus, an image processing system, a lens apparatus, an image processing system, a control method, an image processing method, and a non-transitory computer-readable storage medium that are capable of providing appropriate OTF data depending on the image processing apparatus performing the image restoration processing can be provided. Furthermore, according to each embodiment, a control apparatus, an image processing apparatus, a lens apparatus, an image processing system, an image processing method, and a non-transitory computer-readable storage medium that are capable of storing the appropriate OTF data to perform the image restoration processing can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A control apparatus comprising:
    a storage circuit that stores first data containing a plurality of coefficient data obtained by approximating an optical transfer function of an optical system to an approximation function having a predetermined order;
    an input circuit that inputs information of an image processing apparatus that is different from the control apparatus and performs image processing on an image captured by using the optical system;
    a determination circuit that determines second data that are coefficient data corresponding to an order less than the predetermined order of the approximation function, from the first data stored in the storage circuit based on the information of the image processing apparatus; and an output circuit that outputs the second data to the image processing apparatus.

2. The control apparatus according to claim 1, wherein the approximation function is an orthogonal function.

3. The control apparatus according to claim 1, wherein the determination circuit determines the second data depending on information relating to a maximum order that is permitted by the image processing apparatus.

4. The control apparatus according to claim 3, wherein the determination circuit determines, depending on the information relating to the maximum order, information relating to a maximum gain that is used for generating an image restoration filter.

5. The control apparatus according to claim 4, wherein the determination circuit determines the information relating to the maximum gain so that the lesser is the maximum order, the lesser is the maximum gain.

6. The control apparatus according to claim 4, wherein the maximum gain is correction strength of the image processing performed by the image processing apparatus.

7. The control apparatus according to claim 1, wherein the determination circuit determines the second data based on image capturing condition information that is determined for capturing the image.

8. The control apparatus according to claim 7, wherein the image capturing condition information contains information relating to a focal length, a photographing distance, and an aperture stop.

9. The control apparatus according to claim 1, wherein the storage circuit is capable of acquiring the first data via a network.

10. A lens apparatus comprising:
an optical system configured to form an image of an object;
a storage circuit that stores first data containing a plurality of coefficient data obtained by approximating an optical transfer function of the optical system to an approximation function having a predetermined order;
an input circuit that inputs information of an image processing apparatus that is different from the control apparatus and performs image processing on an image captured by using the optical system;
a determination circuit that determines second data having data that are coefficient data corresponding to an order less than the predetermined order of the approximation function, from the first data stored in the storage circuit based on information of the image processing apparatus; and
an output circuit that outputs the second data to the image processing apparatus.

11. A control method for a control apparatus, the control method comprising the steps of:
inputting information of an image processing apparatus that is different from the control apparatus and performs image processing on an image captured by using an optical system; and
determining second data that are coefficient data corresponding to an order less than a predetermined order of an approximation function, from first data stored in a storage circuit based on the information of the image processing apparatus, the first data containing a plurality of coefficient data obtained by approximating an optical transfer function of an optical system to the approximation function.

12. A non-transitory computer-readable storage medium that stores a program causing a control apparatus to execute a process comprising the steps of:
inputting information of an image processing apparatus that is different from the control apparatus and performs image processing on an image captured by using an optical system; and
determining second data that are coefficient data corresponding to an order less than a predetermined order of an approximation function, from first data stored in a storage circuit based on the information of the image processing apparatus, the first data containing a plurality of coefficient data obtained by approximating an optical transfer function of an optical system to the approximation function.

13. The control apparatus according to claim 5, wherein the determination circuit determines the information relating to the maximum gain so that the lesser is an aperture value of the optical system, the greater is the maximum gain.

* * * * *